United States Patent [19]

Juy

[11] 3,910,136
[45] Oct. 7, 1975

[54] PROTECTION APPARATUS FOR A SPEED CHANGE MECHANISM OF A BICYCLE OR SIMILAR VEHICLE

[76] Inventor: Lucien Charles Hippolyte Juy, 75 rue General Fauconnet, Dijon-Cote-d'Or, France

[22] Filed: Apr. 11, 1974

[21] Appl. No.: 460,212

[30] Foreign Application Priority Data
Apr. 16, 1973 France .............................. 73.14269

[52] U.S. Cl. ................................. 74/611; 74/217 B
[51] Int. Cl.² ........................................ F16D 1/00
[58] Field of Search ...................... 74/217 B, 611, 242.4, 242.11 B, 74/242.14 B, 242.15 B

[56] References Cited
FOREIGN PATENTS OR APPLICATIONS
923,764    7/1947    France .............................. 74/217 B
1,026,080   4/1953    France .............................. 74/217 B Primary Examiner—Samuel Scott
Assistant Examiner—Allan R. Burke
Attorney, Agent, or Firm—Waters, Schwartz & Nissen

[57] ABSTRACT

Protection apparatus for a speed change mechanism mounted on a spoked rear wheel of a two-wheeled vehicle. The speed change mechanism includes a roller assembly for shifting a chain transversely to effect speed change. The protection apparatus comprises a counter-flange on the roller assembly disposed between the rear wheel and the roller assembly, the counterflange having a peripheral edge with a plurality of bend regions at locations where the counter-flange could contact the spokes of the wheel if the roller assembly were excessively displaced. The bend regions are bent in a direction away from the rear wheel to prevent insertion between the spokes of the rear wheel.

14 Claims, 5 Drawing Figures

PROTECTION APPARATUS FOR A SPEED CHANGE MECHANISM OF A BICYCLE OR SIMILAR VEHICLE

FIELD OF THE INVENTION

The invention relates to protection apparatus of speed change mechanisms of bicycles and similar vehicles in which a chain is displaced to provide different speed ratios. Within the framework of the invention is a protection apparatus which is a part of the speed change mechanism.

The invention is particularly applicable to derailleurs and similar accessories of bicycles.

PRIOR ART

Speed change mechanisms operating by derailment of a chain generally comprise a pivotal arm having a transversely deformable parallelogram linkage mounted in proximity to the axis of the rear wheel of the bicycle, and a roller assembly comprising a system of rollers, generally two, on which is wound an endless chain of the bicycle. The rollers are rotatably mounted between a flange and a counter-flange which are usually pivotably carried by the elements for changing the speed, and in all cases are transversely displaced at the time of speed change. The chain is thus transversely displaced to pass from one pinion to another on the rear wheel and thus be derailed and rerailed to change the speed ratio. The speed change mechanism generally comprises adjustable abutment means for limiting transverse displacement of the rollers and their flange and counter-flange in two directions. It can happen, for various reasons that the abutment means breaks down or otherwise gets out of order and does not achieve its function with precision. In such case, the elastic means for changing the speed which acts in a direction to effect transverse displacement, causes the counter-flange of the rollers to become engaged in the spokes of the wheel. Serious damage results, not only to the wheel, but to the speed change mechanism as well, which can put the vehicle out of operation, be it a bicycle or motorcycle or the like. Moreover, the sudden impact at relatively high speed can also result in a very serious fall for the user.

SUMMARY OF THE INVENTION

According to the invention, such accidents are prevented by a protection apparatus which is characterized in that the counter-flange of the roller assembly, closest to the wheel, is shaped to form a rim around the axis of each roller with a bend region having a curved edge disposed over a sector as extended as possible, the curved edge being folded down towards the side of the roller and away from the wheel, while nevertheless providing the space necessary for passage of the chain and for resting of the pins of the chain in the teeth of the rollers.

According to another feature of the invention, the same counter-flange comprises a projection or bend region at the side corresponding to the approach and the passage of the spokes according to the rotation of the wheel at the time of advance of the vehicle, said projection being formed by substantially bending an edge of the counter-flange towards the associated roller, and away from the spokes, the projection being sufficiently distant from the roller to leave free passage for the chain.

DETAILED DESCRIPTION

Figure 2:
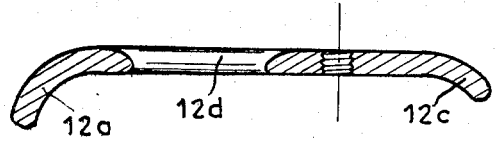
FIGS. 2–4 are sectional views respectively taken along lines 2—2, 3—3, and 4—4 in FIG. 1.
Figure 3:
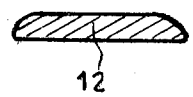
Figure 4:
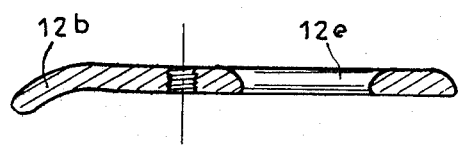
Figure 1:
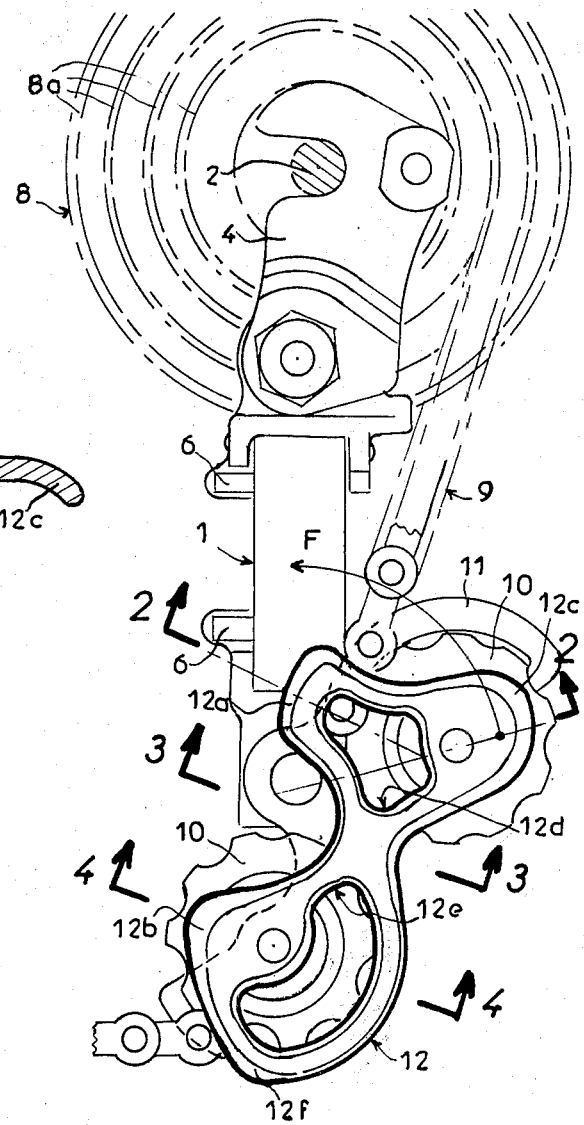
FIG. 1 is a side elevational view viewed from the interior or side of the wheel of a speed change mechanism of the type with articulated parallelogram represented solely by way of example, the speed change mechanism being mounted on the axle of the rear wheel and being provided with the protection apparatus according to the invention shown in heavy outline.

Referring to the drawing showing an embodiment of the invention, by way of example, therein is seen a rear derailleur 1 having a deformable parallelogram linkage fixed on axle 2 of rear wheel 3 of a bicycle or the like by means of a bracket 4 secured in conventional manner, such as by threaded wing-nut 5.

The derailleur 1 has adjustable abutments 6, 7 limiting the deformation of the parallelogram linkage as a function of the number of pinions or sprockets 8a of the free wheel cluster 8. The derailleur should cover the chain 9 passing through the derailleur, i.e. on the running and return rollers 10 mounted between a flange 11 and a counter-flange 12. The counter-flange faces the wheel and is the subject of the present invention.

The counter-flange 12 can be made of any suitable material such as sheet metal punched and stamped to shape, or a plastic material, reinforced or not.

The counter-flange is shaped to prevent engagement of the derailleur in the spokes of the wheel in the event of misregulation or breakdown of the abutments 6, 7 while also permitting passage of the chain at the time of engagement and disengagement with the sprockets and also permitting the engagement of the pins of the chain on the teeth of the rollers 10.

For these purposes, the counter-flange is provided with substantial bend regions at certain locations at the periphery of the counter-flange, i.e. at 12a, 12b, and 12c, whereas the remainder of the periphery presents a planar profile with rounded edges.

The bend region 12a is bent away from the wheel 3 and far from the adjacent roller 10 to allow passage of the chain over the roller and under region 12a.

Figure 5:
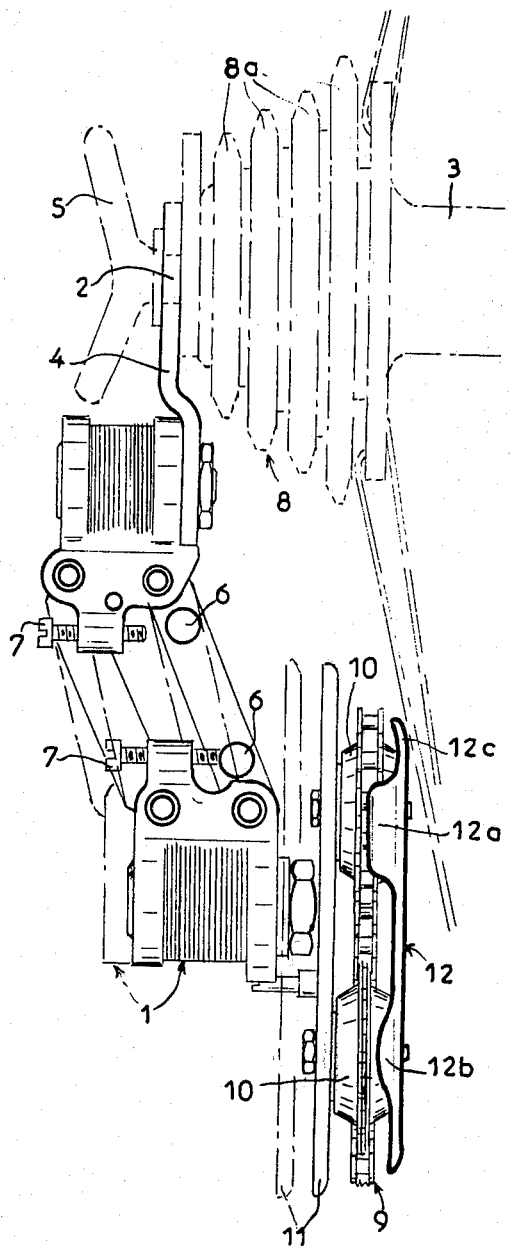
FIG. 5 is a front view of the speed change mechanism considered parallel to the wheel which is shown in chain-dotted outline, the roller carrier and counter-flange also being shown in normal operative position in chain dotted outline and in solid lines in an accidental displaced position against the spokes of the wheel, the counter-flange being shown in heavy outline.

Considering the general position of the derailleur and therefore the counter-flange, the bend regions 12a, 12b, 12c, are those which run the risk of initially contacting the spokes of the wheel if the abutments are misregulated or break down and the derailleur is displaced too far to the right as seen in FIG. 5. These bend regions are curved so that in the event of periodic contact with the spokes, the counter-flange is pushed backwards away from the wheel and thus avoids blockage of the wheel, impairment thereof, and especially falling of the cyclist who can easily stop the bicycle when he hears the noise produced by the contact of the counter-flange with the spokes.

In a preferred manner, which is not however limitative, the counter-flange is provided with holes at 12d and 12e to reduce the weight of the counter-flange, this being important from the viewpoint of competitive racing. Also, for this reason, the counter-flange is necked down in its center so as to have a general 8 shape with upper and lower lobes.

It is also noted that the shape and size of the lower portion 12f has been determined in a manner to avoid, when the roller assembly is tilted in the direction of arrow F, that the lightly floating chain can not ride on the edge of the portion 12f due to vibration or shocks.

The tilted position of the roller assembly corresponds to that when the chain is placed on the small sprocket of the free wheel cluster and on the small chain wheel of the crank gear at the front derailleur.

The invention is not limited to the specific embodiment disclosed but rather embraces all variations and modifications, which fall within the spirit and scope of the invention as defined in the appended claims.

What is claimed is:

1. Protection apparatus for a speed change mechanism mounted on a spoked rear wheel of a vehicle in which a chain is transversely displaced by a roller assembly to effect speed change, said protection apparatus comprising a counter-flange on the roller assembly disposed between the rear wheel and the roller assembly, said counter-flange having a peripheral edge with a plurality of bend regions at locations where the counter-flange could contact the spokes of the wheel if the roller assembly were excessively displaced towards said spokes, said bend regions being bent in a direction away from the rear wheel to prevent insertion of the counterflange between the spokes of the rear wheel.

2. Apparatus as claimed in claim 1 wherein said counter-flange has a plurality of angular positions with a plurality of locations successively closest to the rear wheel at which said bend regions are provided, said bend regions being curved to extend around the axis of an associated roller over a substantial extent, and being bent to provide a sufficient spacing with the roller to permit passage of the chain between the bent part of the bend region and the roller.

3. Apparatus as claimed in claim 2 wherein said roller has teeth and said chain includes pins, said bent part being sufficiently spaced from the roller to allow the chain to pass therebetween and the pins of the chain to rest between the teeth of the roller.

4. Apparatus as claimed in claim 1 wherein each said bend region on said counter-flange includes a projection in a zone corresponding to the approach and passage of the spokes of the wheel in regard to the rotation of the wheel for advance of the vehicle, said projection having a profiled extremity and an edge bent towards said roller assembly and sufficiently spaced therefrom to permit free passage of said chain.

5. Apparatus as claimed in claim 1 wherein said counter-flange is provided with holes for weight reduction.

6. Apparatus as claimed in claim 1 wherein said counter-flange is constructed from sheet metal which is punched and stamped to shape.

7. Apparatus as claimed in claim 1 wherein said counter-flange is constructed from plastic material.

8. Apparatus as claimed in claim 1 wherein said counter-flange has a lower end facing the chain where it enters the roller assembly, said counter-flanger being shaped at said lower end to prevent the chain from riding on the edge of said counter-flange at said lower end when the upper part of the roller assembly is upwardly and forwardly pivoted relative to the axle of the rear wheel for speed change to higher gear ratios.

9. Apparatus as claimed in claim 1 wherein said counter-flange is in the general shape of an 8.

10. Apparatus as claimed in claim 1 wherein said bend regions are curved so that contact thereof with the spokes will cause the counter-flange to be displaced away from the wheel.

11. Apparatus as claimed in claim 1 wherein said roller assembly includes upper and lower rollers, the chain passing on a portion of said lower roller and then on a portion of said upper roller, one of said bend regions being formed on said counter-flange adjacent the upper roller and overlying the chain passing on said upper roller.

12. Apparatus as claimed in claim 11 wherein said one bend region has an elongated peripheral edge.

13. Apparatus as claimed in claim 11 wherein a second of said bend regions is formed proximate the lower roller.

14. Apparatus as claimed in claim 11 wherein a third of said bend regions is formed at the bottom of said counter-flange in immediate proximity to where the chain passes on said lower roller and is so shaped to retain the chain on the lower roller and to prevent the chain from riding up and over the counter-flange.

* * * * *